United States Patent [19]

Cushman

[11] Patent Number: 5,647,710
[45] Date of Patent: Jul. 15, 1997

[54] BOLT WITH REMOVABLE HEAD

[76] Inventor: Paul W. Cushman, General Delivery, Soap Lake, Wash. 98851

[21] Appl. No.: 443,592

[22] Filed: May 17, 1995

[51] Int. Cl.$^6$ .................................................. F16B 35/06
[52] U.S. Cl. ........................ 411/397; 411/542; 411/389
[58] Field of Search ............................. 411/397, 396, 411/542, 374, 366, 383, 403, 389, 369, 915

[56] References Cited

U.S. PATENT DOCUMENTS

| | | | |
|---|---|---|---|
| 1,295,873 | 3/1919 | Dodds | 411/403 |
| 2,752,814 | 7/1956 | Iaia | 411/542 |
| 4,353,509 | 10/1982 | Collet | 411/383 |
| 4,480,513 | 11/1984 | McCauley | 411/389 |
| 4,770,584 | 9/1988 | Vinciguerra | 411/366 |
| 5,222,851 | 6/1993 | Dickerson | 411/397 |

FOREIGN PATENT DOCUMENTS 1525155  4/1968  France .................... 411/389

*Primary Examiner*—Flemming Saether
*Attorney, Agent, or Firm*—Michael J. Colitz, Jr.

[57] ABSTRACT

A kit comprised of an elongated threaded bolt having two end portions and an intermediate threaded portion therebetween. The two end portions have Allen wrench drives formed therein. The device includes a pair of removable cap heads each having an inner surface and an outer surface. The inner surface has an internally threaded aperture formed therein. The internally threaded aperture is adapted for removable coupling with the two end portions of the elongated threaded bolt. The inner surface of the removable cap head has a circular groove formed therein surrounding the internally threaded aperture thereof for placement of an O-ring therein. The outer surface of the removable cap head has an Allen wrench drive formed therein.

3 Claims, 4 Drawing Sheets

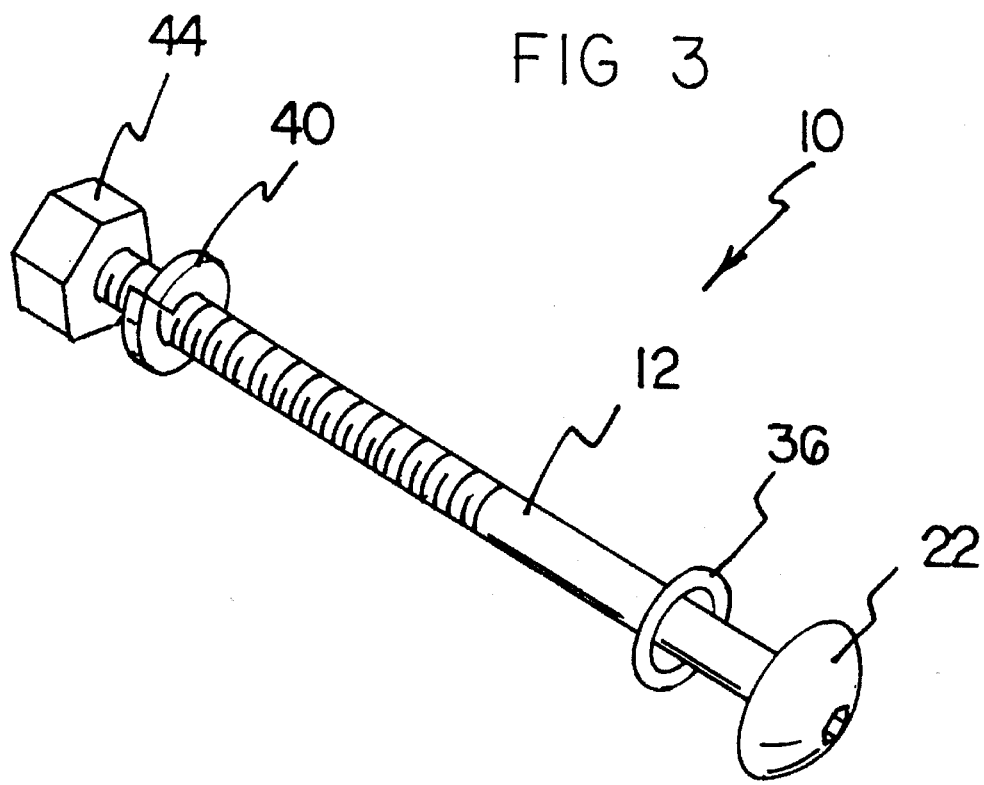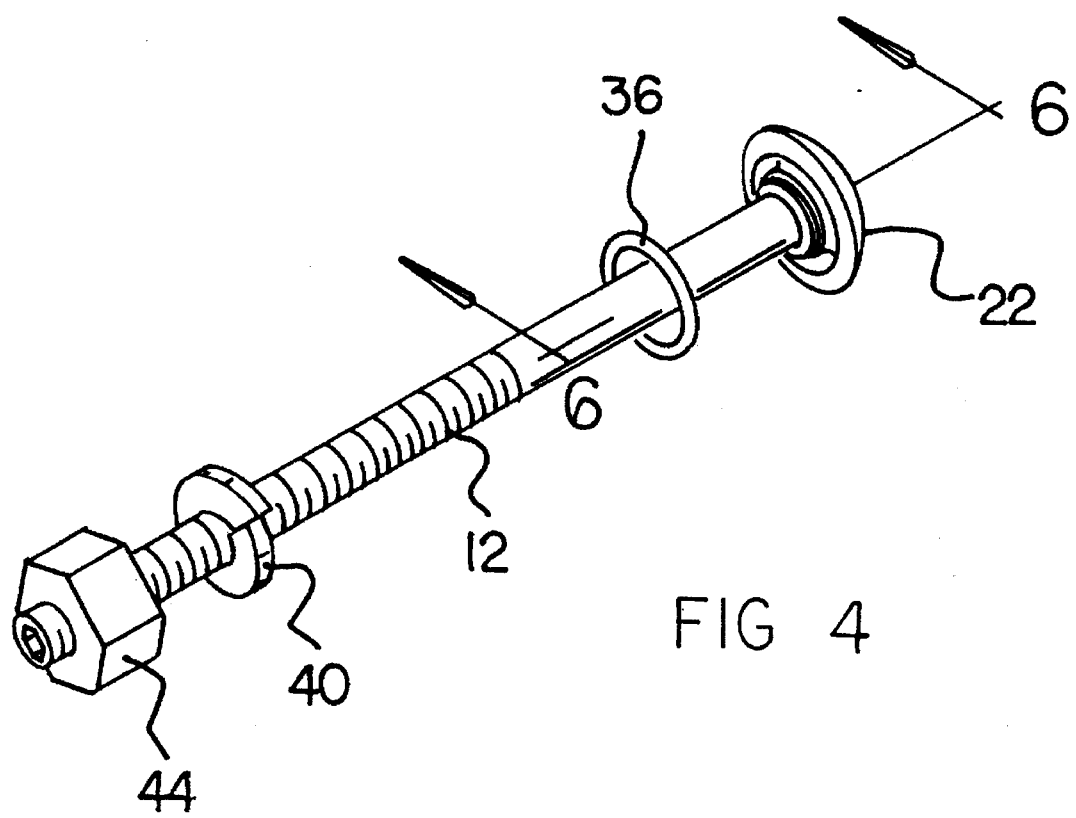

BOLT WITH REMOVABLE HEAD

BACKGROUND OF THE INVENTION

1. Field of the Invention

The present invention relates to a bolt with removable head and more particularly pertains to providing a versatile bolt for use on projects around the home, automobiles, and motorcycles with a bolt with removable head.

2. Description of the Prior Art

The use of bolts is known in the prior art. More specifically, bolts heretofore devised and utilized for the purpose of acting as a securing means are known to consist basically of familiar, expected and obvious structural configurations, notwithstanding the myriad of designs encompassed by the crowded prior art which have been developed for the fulfillment of countless objectives and requirements.

By way of example, Hozapfel et al. U.S. Pat. No. Des. 336,844 discloses the ornamental design for a bolt.

Hill U.S. Pat. No. Des. 286,372 discloses the ornamental design for a bolt.

Ono U.S. Pat. No. Des. 245,147 discloses the ornamental design for a hexagonal headed bolt.

Yamamoto U.S. Pat. No. Des. 317,862 discloses the ornamental design for a bolt.

Hainke et al. U.S. Pat. No. 5,275,519 discloses an anchor bolt.

While these devices fulfill their respective, particular objective and requirements, the aforementioned patents do not describe a bolt with removable head for providing a versatile bolt for use on projects around the home, automobiles, and motorcycles.

In this respect, the bolt with removable head according to the present invention substantially departs from the conventional concepts and designs of the prior art, and in doing so provides an apparatus primarily developed for the purpose of providing a versatile bolt for use on projects around the home, automobiles, and motorcycles.

Therefore, it can be appreciated that there exists a continuing need for new and improved bolt with removable head which can be used for providing a versatile bolt for use on projects around the home, automobiles, and motorcycles. In this regard, the present invention substantially fulfills this need.

SUMMARY OF THE INVENTION

In the view of the foregoing disadvantages inherent in the known types of bolts now present in the prior art, the present invention provides an improved bolt with removable head. As such, the general purpose of the present invention, which will be described subsequently in greater detail, is to provide a new and improved bolt with removable head and method which has all the advantages of the prior art and none of the disadvantages.

To attain this, the present invention essentially comprises an elongated threaded bolt having two end portions and an intermediate threaded portion therebetween. The two end portions have Allen wrench drives formed therein. The device contains a removable cap head having an inner surface and an outer surface. The inner surface has an internally threaded aperture formed therein. The internally threaded aperture is adapted for removable coupling with one of the two end portions of the elongated threaded bolt. The inner surface of the removable cap head has a circular groove formed therein surrounding the internally threaded aperture thereof. The outer surface of the removable cap head has an Allen wrench drive formed therein. An O-ring is adapted for removable securement within the circular groove formed in the interior surface of the removable cap head. A lock washer is adapted for removable coupling with the intermediate threaded portion of the elongated threaded bolt. A nut is adapted for removable securement with an opposing end portion of the elongated threaded bolt for securing the elongated threaded bolt within an object.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bolt with removable head which has all the advantages of the prior art bolts and none of the disadvantages.

It is another object of the present invention to provide a new and improved bolt with removable head which may be easily and efficiently manufactured and marketed.

It is a further object of the present invention to provide a new and improved bolt with removable head which is of durable and reliable construction.

An even further object of the present invention is to provide a new and improved bolt with removable head which is susceptible of a low cost of manufacture with regard to both materials and labor, and which accordingly is then susceptible of low prices of sale to the consuming public, thereby making such a bolt with removable head economically available to the buying public.

Still yet another object of the present invention is to provide a new and improved bolt with removable head which provides in the apparatuses and methods of the prior art some of the advantages thereof, while simultaneously overcoming some of the disadvantages normally associated therewith.

Even still another object of the present invention is to provide a new and improved bolt with removable head for providing a versatile bolt for use on projects around the home, automobiles, and motorcycles.

Lastly, it is an object of the present invention to provide a new and improved bolt with removable head comprised of an elongated threaded bolt having two end portions and an intermediate threaded portion therebetween. The two end portions have Allen wrench drives formed therein. The device includes a pair of removable cap heads each having an inner surface and an outer surface. The inner surface has an internally threaded aperture formed therein. The internally threaded aperture is adapted for removable coupling with the two end portions of the elongated threaded bolt. The inner surface of the removable cap head has a circular groove formed therein surrounding the internally threaded aperture thereof for placement of an O-ring therein. The outer surface of the removable cap head has an Allen wrench drive formed therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the bolt with removable head constructed in accordance with the principles of the present invention.

FIG. 4 is a perspective elevation view of the present invention.

The same reference numerals refer to the same parts through the various Figures.

DESCRIPTION OF THE PREFERRED EMBODIMENT

Figure 1:
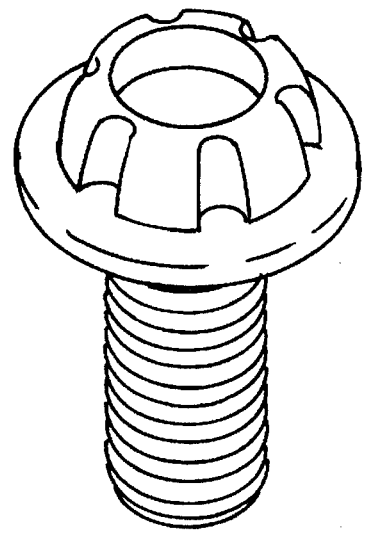
FIG. 1 is a top perspective view of the prior art ornamental design for a bolt.
Figure 2:
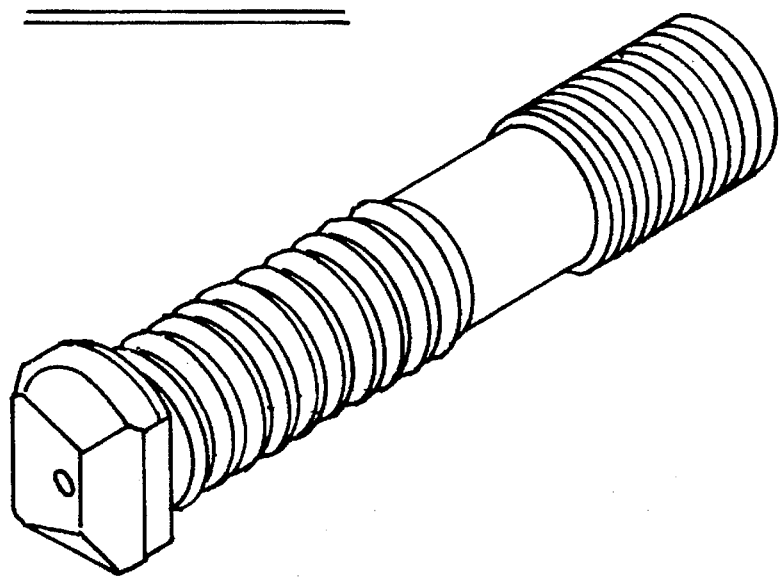
FIG. 2 is a perspective view of the prior art ornamental design for a bolt.
Figure 5:
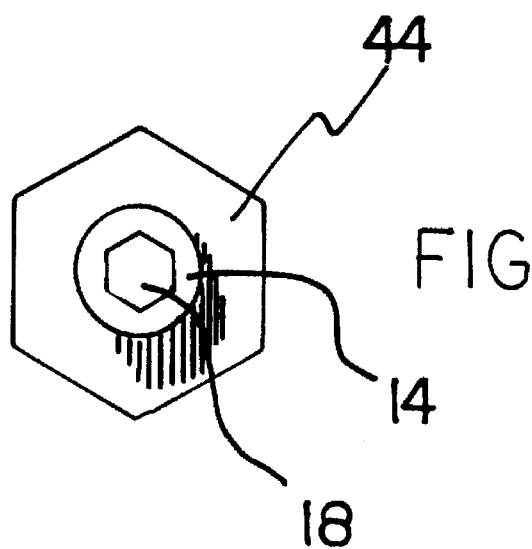
FIG. 5 is a front elevation view of the threaded bolt of the present invention.
Figure 6:
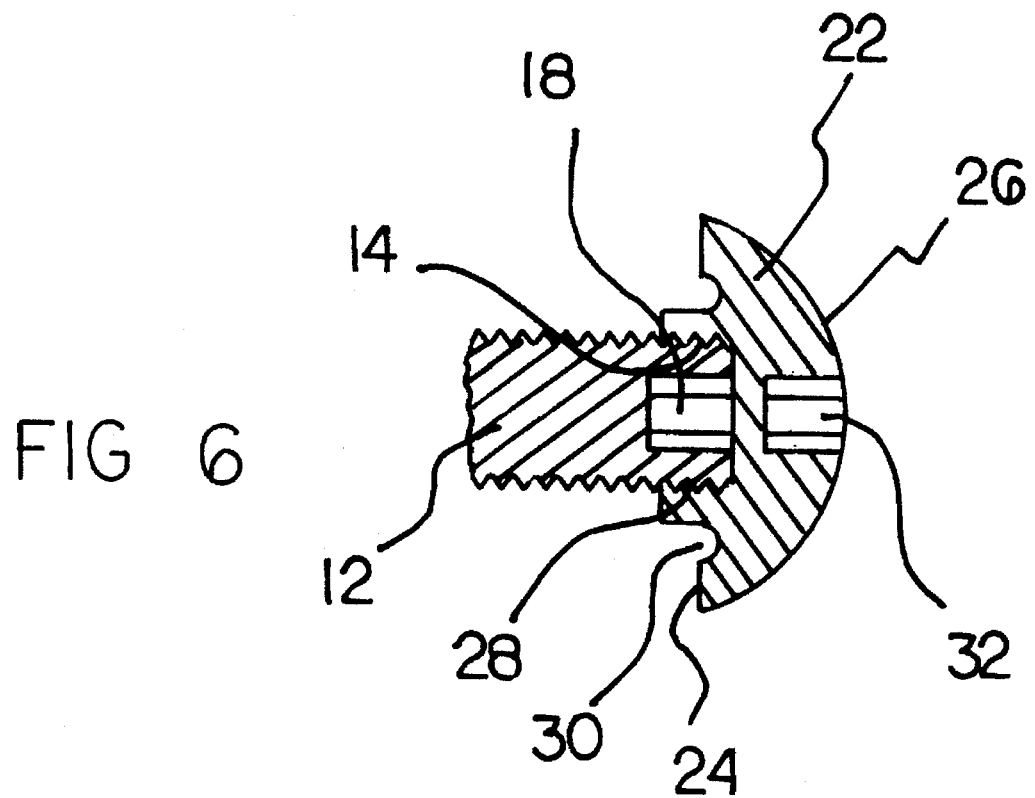
FIG. 6 is a cross-sectional view as taken along line 6—6 of FIG. 4.
Figure 7:
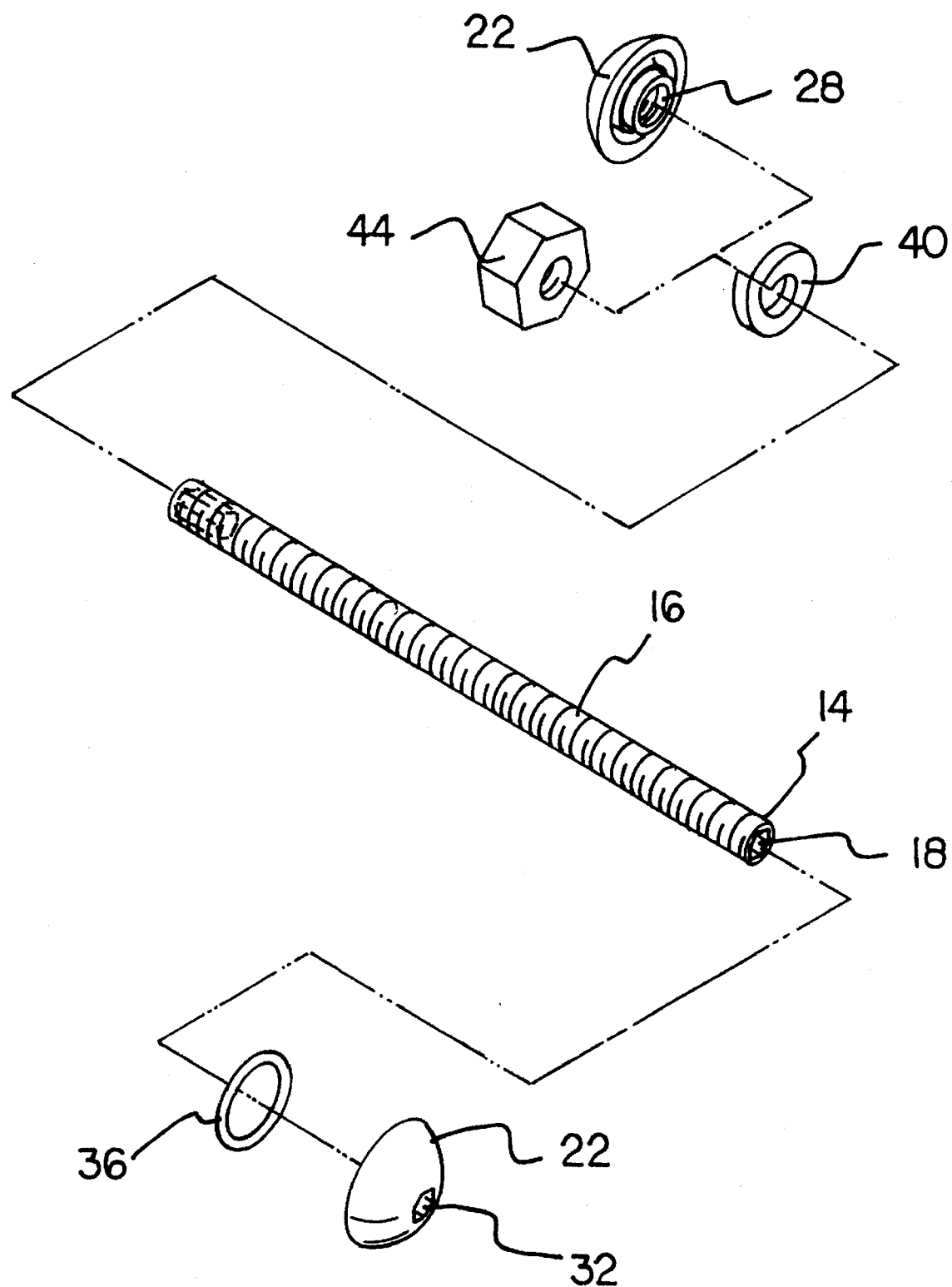
FIG. 7 is an exploded perspective view of the present invention.

With reference now to the drawings, and in particular, to FIG. 3-7 thereof, the preferred embodiment of the new and improved bolt with removable head embodying the principles and concepts of the present invention and generally designated by the reference number 10 will be described.

Specifically, it will be noted in the various Figures that the device relates to a new and improved bolt with removable head for providing a versatile bolt for use on projects around the home, automobiles, and motorcycles. In its broadest context, the device consists of an elongated threaded bolt, a removable cap head, an O-ring, a lock washer, and a nut.

The device 10 contains an elongated threaded bolt 12 having two end portions 14 and an intermediate threaded portion 16 therebetween. The two end portions 14 have Allen wrench drives 18 formed therein. The elongated threaded bolt 12 could be made in a variety of lengths and sizes. The widths can vary to correspond with differing hole sizes.

The device 10 contains a removable cap head 22 having an inner surface 24 and an outer surface 26. The outer surface 26 is circular with smooth edges that will allow the removable cap head 22 to catch dirt and grease associated in use on an automobile or motorcycle. The inner surface 24 has an internally threaded aperture 28 formed therein. The internally threaded aperture 28 is adapted for removable coupling with one of the two end portions 14 of the elongated threaded bolt 12. The inner surface 24 of the removable cap head 22 has a circular groove 30 formed therein surrounding the internally threaded aperture 28 thereof. The outer surface 26 of the removable cap head 22 has an Allen wrench drive 32 formed therein. Additional removable cap heads 22 can also be incorporated to be secured to both of the two end portions 14 of the elongated threaded bolt 12. The Allen wrench drive 32 allows the removable cap head 22 to be removed from the elongated threaded bolt 12.

An O-ring 36 is adapted for removable securement within the circular groove 30 formed in the inner surface 24 of the removable cap head 22. The O-ring 36 permits the device 10 to be used to plug holes in oil and gasoline tanks thereby preventing an impurities from entering into the tanks.

A lock washer 40 is adapted for removable coupling with the intermediate threaded portion 16 of the elongated threaded bolt 12. The lock washer 40 is identical to lock washers currently on the market and has an identical application—to prevent rotation of a nut.

A nut 44 is adapted for removable securement with an opposing end portion 14 of the elongated threaded bolt 12 for securing the elongated threaded bolt 12 within an object, such as an automobile or a motorcycle.

The present invention has a removable cap head 22 with an elongated threaded bolt 12 having Allen wrench sockets 18 at both ends.

The device 10 could be available in Unified Screw-thread Standards or metric threads. It can be used with a conventional lockwasher 40 and nut 44, and the removable cap head 22 has a groove 30 for an O-ring 36. Underneath the head 22 are internal threads so it can be screwed onto the elongated threaded bolt 12. There is an Allen wrench drive 32 in the top of the removable cap head 22 and at each end 18 of the elongated threaded bolt 12, so that only one tool is needed to install this device 10 in any configuration. Tightened from one end, it can be removed from the other. The device 10 may also be used with a removable cap head 22 secured at each end of the elongated threaded bolt 12.

Used in normal applications, this bolt 12 functions like a conventional machine screw. Without the removable cap head 22, it does not trap dirt and oil like normal bolt heads, which makes it better for sanitary applications. With the cap head 22 and an O-ring 36, the bolt 12 could plug holes in tanks, and the O-ring 36 may prevent rust from seeping into the tank. This device 10 could be available in kit form in a variety of sizes and lengths, or installed on assemblies at the time of manufacture.

The versatile bolt 12 is ideal for use on projects around the home, automobiles, motorcycles, hospitals and industrial applications. When used on an assembly, it gives a clean professional look to it.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A kit for providing a versatile bolt for use on projects around the home, automobiles, and motorcycles comprising, in combination:

an elongated threaded bolt having two end portions and an intermediate threaded portion therebetween, the two end portions having Allen wrench drives formed therein;

a removable cap head having an inner surface and an outer surface, the inner surface having an internally threaded aperture formed therein, the internally threaded aperture being adapted for removable coupling with one of the two end portions of the elongated threaded bolt, the inner surface of the removable cap head having a circular groove formed therein surrounding the internally threaded aperture thereof, the outer surface of the removable cap head having an Allen wrench drive formed therein;

an O-ring being adapted for removable securement within the circular groove formed in the inner surface of the removable cap head;

a lock washer being adapted for removable coupling with the intermediate threaded portion of the elongated threaded bolt;

a nut being adapted for removable securement with an opposing end portion of the elongated threaded bolt for securing the elongated threaded bolt within an object.

2. A kit for providing a versatile bolt for use on projects around the home, automobiles, and motorcycles comprising, in combination:

an elongated threaded bolt having two end portions and an intermediate threaded portion therebetween, the two end portions having Allen wrench drives formed therein;

a pair of removable cap heads each having an inner surface and an outer surface, the inner surface having an internally threaded aperture formed therein, the internally threaded aperture being adapted for removable coupling with the two end portions of the elongated threaded bolt, the inner surface of the removable cap head having a circular groove formed therein surrounding the internally threaded aperture thereof, the outer surface of the removable cap head having an Allen wrench drive formed therein.

3. The kit as described in claim 2 and further including an O-ring being adapted for removable securement within the circular groove formed in the inner surface of the pair of removable cap heads.

* * * * *